Aug. 20, 1935.   E. PAPPERT   2,011,906
END PIECE FOR RIMLESS SPECTACLES
Filed May 18, 1933
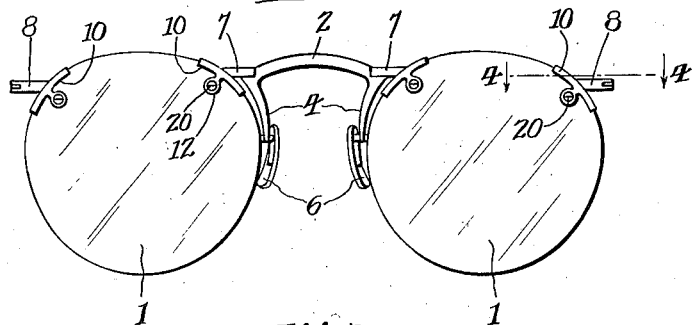
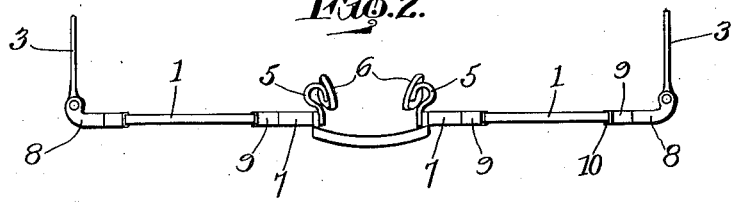
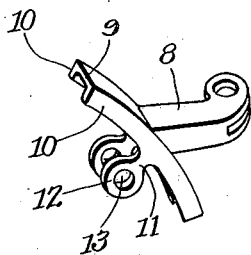
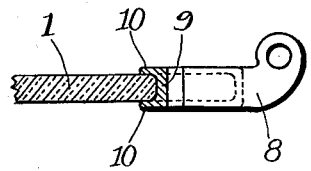
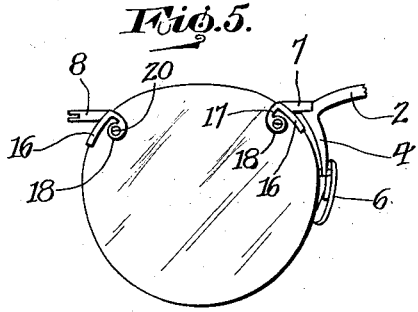
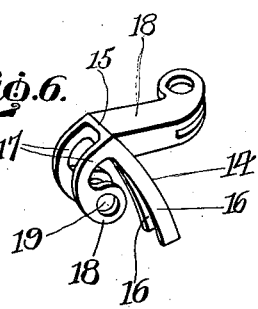
Inventor
Emanuel Pappert
By Geo. P. Kimmel
Attorney Patented Aug. 20, 1935

2,011,906

UNITED STATES PATENT OFFICE 2,011,906

ENDPIECE FOR RIMLESS SPECTACLES

Emanuel Pappert, Flushing, N. Y., assignor to George P. Kimmel, Washington, D. C.

Application May 18, 1933, Serial No. 671,736

13 Claims. (Cl. 88—47)

This invention relates in general to spectacles and more particularly has reference to a lens strap adapted for use in rimless spectacle mountings.

In the past, lens straps used in rimless mountings have consisted essentially of a lens edge engaging portion for the purpose of engaging the edge of a lens, and of a pair of strap ears extending inwardly on opposite faces of the lens from substantially the central portion of the edge engaging part. This type of lens strap has proved adequate for ordinary usage where the lens strap connections are placed substantially on the horizontal center lines of the lenses and on the level with the nose rest means carried by the bridge.

However, there has recently come into popularity a new type of spectacle in which the endpieces carrying the temples have been placed above the horizontal center line of the lenses and above the useful field of side vision both for the purposes of ornamentation and utility. In adapting this type of mounting to rimless spectacles, however, considerable difficulty has been encountered, because of the additional strain placed upon the connection between the lens straps and the lenses due to the difference in level between the temple connection and the nose rest means carried by the bridge. It will readily be seen that this difference in level will cause the lower parts of the lenses to tend to swing outwardly with respect to the temple connection and thus cause a twisting effect upon the lenses by the lens straps. Furthermore, in connection with the high endpiece type of spectacles it has been found desirable to place the lens strap connections by which the bridge is secured to the lenses on a level comparable with that of the temple connection. Where this is done, it will readily be seen that a considerable torsional stress is produced when the spectacles are upon the face tending to swing the lower portion of the bridge carrying the nose rest means outwardly with respect to the lenses.

In both of these connections, this torsional stress which has been produced has been found sufficient to cause considerable breakage of lenses as well as lacking the ordinary stability required in spectacle mountings. The lens straps mentioned have been found to work loose quickly and to be on the whole inadequate to form proper support for the lenses.

It is therefore one of the objects of this invention to produce a rimless type of spectacle mounting in which the connections between the supporting members and the lenses are to be positioned high and above the nose rest means of the bridge, and yet in which the necessary strength and distribution of stresses will be taken care of. It is further an object that the portions connecting to the various lens straps shall be such as to be normally horizontal and at an acute angle with respect to the lens straps.

It is further an object of this invention to produce a spectacle of the type set forth which will have all of the ornamental advantages desired for a structure of this type and yet which will lose none of the advantages of strength and rigidity which are ordinarily lost when these ornamental features are introduced.

Other objects and advantages of this invention will become apparent from the following description taken in connection with the accompanying drawing, it being distinctly understood that the same are by way of illustration and example only and are not to be taken as in any way limiting the spirit or scope of this invention. The spirit and scope of this invention is to be limited only by the prior art taken in connection with the accompanying claims.

Referring now more particularly to the drawing in which like numerals indicate corresponding parts throughout:

Figure 1 is a front view of a spectacle constructed in accordance with this invention.

Figure 2 is a plan view of the construction illustrated in Figure 1.

Figure 3 is a perspective view illustrating one of the endpieces shown in Figures 1 and 2.

Figure 4 is a sectional view taken along the line 4—4 of Figure 1.

Figure 5 is a view similar to Figure 1 showing a part of a spectacle front and illustrating a slightly modified form of this invention.

Figure 6 is a view similar to Figure 3 and illustrating an endpiece of the type shown in Figure 5.

In accordance with this invention, the spectacle illustrated in the drawing consists of a pair of lenses 1 connected by a bridge member 2 and adapted to be held in place before the face by a pair of temples 3.

The lenses 1 are illustrated in this instance as having a curved outline although it is to be clearly understood that the particular configuration of the lens may be whatever shape is found to be most desirable for the particular patient.

The bridge illustrated is of the high arch type having an upper or top portion of arcuate contour terminating at its ends into downwardly depending legs 4 at the ends thereof. These legs 4 are shaped to substantially conform to the contour of the edges of the lenses 1 and terminate at a point substantially on the horizontal center lines of these lenses. At their lower ends, these legs 4 are provided with rearwardly extending pad arms 5. The rearward end of each pad arm 5 extends downwardly and carries a nose pad or nose rest 6 at its lower end.

Adjacent the uppermost portion of the bridge, it is provided on its opposite sides with a pair of normally horizontal parts 7 to the outer ends of which are secured the lens straps for engaging the lenses. The parts 7 extend from the ends of the arcuate top portion of the bridge.

The endpieces 8 to which the temples 3 are pivotally secured in the ordinary manner are disposed in a normally horizontal position with respect to the lenses 1 and at points adjacent the upper edges of these lenses. At their inner ends, these endpieces are provided with lens straps for securing them to the lenses.

The lens straps provided for the endpieces 8 and for the horizontal bridge portions 7 in Figure 1 are illustrated in detail in Figure 3. From this figure, it will be seen that these lens straps consist of channel-shaped members having lens engaging portions 9 and depending side flanges 10 adapted to engage the opposite faces of the respective lenses and thus serve to distribute the torsional stresses previously referred to along a substantial length of the edge of the lens instead of concentrating it at one point. Lens strap ears 11 are provided which may be formed integral with the depending side flanges 10 and extending belond these side flanges. These lens strap ears 11 each have an enlarged terminal portion 12 having an opening 13 adapted to receive a screw or other suitable means for securing the lens strap in place on the lens. The lens straps utilized in connection with the bridge illustrated in Figures 1 and 2 are substantially identical with the ones just described in connection with the endpiece.

The channel shaped member for the part 7 extends upon the top edge of the lens from the upper end of the nasal edge of the lens. The channel shaped member of the endpiece 8 extends upon the top edge of the lens from a point below and in close proximity to the top of the temple side edge of the lens. The upper end of the channel shaped member for the part 7 is arranged slightly above the upper end of the channel shaped member for the endpiece 8. The ears extended from the channel shaped member for the part 7 have their lower ends arranged slightly above the lower ends of the ears extended from the channel shaped member for the endpiece 8. The lower ends of said members and ears are located completely above the center of the pupil of the eye when the lens is in position before the eye. The high part of the upper edge of the arcuate top portion of the bridge is in substantial horizontal alignment with the high part of the top edge of either lens. The endpiece 8 is arranged slightly below the part 7.

With reference to the form illustrated in Figures 5 and 6, the spectacle construction is substantially as described in connection with Figures 1 to 4 inclusive, the chief difference being in the particular details of construction of the lens strap. In Figures 5 and 6, the horizontal parts 7 of the bridge and the endpiece 8 are secured to the uppermost end of the lens strap 14 instead of substantially at its center as in Figure 1. This lens strap however is provided with an edge engaging portion 15 corresponding to the portion 9 of the lens strap shown in Figure 1, and is likewise provided with two depending side flanges 16 which are opposed to each other and serve the same function as the side flanges 10 in the previously described form. The lens strap ears 17 are formed integral with the side flanges 16, but are joined to these side flanges at a point in substantial alignment with the horizontal portion of the endpiece or the bridge as the case may be. From such point they curve downwardly and terminate in enlarged portions 18 having perforations 19 for the purpose of receiving suitable securing means such as screws 20 or the like.

It will be noted that in both forms illustrated, the position of the securing means for securing the lens straps in place on the lens is so located as to lie on a normal to the edge engaging portion intermediate the ends of the edge engaging portion. It will be appreciated that this position of the securing means is essential for the purpose of preventing the lens strap from swinging about its securing means as a pivot. In the form illustrated in Figures 5 and 6, it is particularly noteworthy that because of the curved contour of the lens strap ears 17 a slight resiliency will be allowed whereby the supporting member which carries the strap will be allowed a very slight movement so as to take up for any sudden jerk which may be encountered.

It will be noted from the above that a spectacle of the high endpiece type has been provided in which lenses are rimless, and yet in which the high position of the endpieces and the torsional effect produced by the difference in level between the endpieces or temple connections and the nose rest means is adequately compensated for so as to distribute these torsional stresses in such a manner that the liability of lens breakage will be reduced to a minimum. At the same time, the side flanges 10 and 16 respectively will serve to rigidly mount the lens straps upon the edges of the lenses so that substantially no twisting movement will take place and the lens straps and their connections will not be so apt to become loosened in use. It will further be seen that by the use of a lens strap such as illustrated the connections between the bridge and the lenses may be positioned above the nose rest means while at the same time the additional stress placed upon the lens connections will be adequately compensated for by means of the side flanges 10 and 16 which distribute these stresses along the edges of the respective lenses.

It is to be understood that various changes in the details and arrangements of parts may be made without departing from the spirit or scope of this invention as set forth in the appended claims.

What I claim is:—

1. In rimless spectacles, a pair of lenses, a bridge including an arcuate top portion provided at each end with a horizontal part directed towards the top edge of a lens, a pair of oppositely disposed spaced channel shaped members mounted against each lens, one of the members of each pair being seated upon the inner end portion of the top edge and terminating at one end at the top of the nasal side edge of a lens, the other member of each pair being seated upon the outer end portion of the top and upper end portion of the temple side edges of a lens and terminating at one end at a point below and in proximity to the upper end of the temple side edge of the lens, a pair of ears extending inwardly from each of said members, said ears being anchored against the faces of a lens, each of said horizontal parts merging into one of the members of said pair of members, and a pair of temple endpieces, each of said endpieces merging at its inner end into the other member of each pair of members.

2. In rimless spectacles, a pair of lenses, a bridge including an arcuate top portion provided at each end with a horizontal part directed towards the top edge of a lens, a pair of oppositely disposed spaced channel shaped members mounted against each lens, one of the members of each pair being seated upon the inner end portion of the top edge and terminating at one end at the top of the nasal side edge of a lens, the other member of each pair being seated upon the outer end portion of the top and upper end portions of the temple side edges of a lens and terminating at one end at a point below and in proximity to the upper end of the temple side edge of the lens, a pair of ears extending inwardly from each of said members, said ears being anchored against the faces of a lens, each of said horizontal parts merging into one of the members of said pair of members, a pair of temple endpieces, each of said endpieces merging at its inner end into the other member of each pair of members, and said endpieces and horizontal parts being spaced from the lower ends of said members, said endpieces being located below said horizontal parts.

3. In rimless spectacles, a pair of lenses, a bridge including an arcuate top portion provided at each end with a horizontal part directed towards the top edge of a lens, a pair of oppositely disposed spaced channel shaped members mounted against each lens, one of the members of each pair being seated upon the inner end portion of the top edge and terminating at one end at the top of the nasal side edge of a lens, the other member of each pair being seated upon the outer end portion of the top and upper end portion of the temple side edges of a lens and terminating at one end at a point below and in proximity to the upper end of the temple side edge of the lens, a pair of ears extending inwardly from each of said members, said ears being anchored against the faces of a lens, each of said horizontal parts merging into one of the members of said pair of members, a pair of temple endpieces, each of said endpieces merging at its inner end into the other member of each pair of members, and said endpieces and horizontal parts being positioned at the upper ends of said members.

4. In rimless spectacles, a pair of lenses, a bridge including an arcuate top portion provided at each end with a horizontal part directed towards the top edge of a lens, a pair of oppositely disposed spaced channel shaped members mounted against each lens, one of the members of each pair being seated upon the inner end portion of the top edge and terminating at one end at the top of the nasal side edge of a lens, the other member of each pair being seated upon the outer end portion of the top and upper end portion of the temple side edges of a lens and terminating at one end at a point below and in proximity to the upper end of the temple side edge of the lens, a pair of ears extending inwardly from each of said members, said ears being anchored against the faces of a lens, each of said horizontal parts merging into one of the members of said pair of members, a pair of temple endpieces, each of said endpieces merging at its inner end into the other member of each pair of members, and said horizontal parts being located above said endpieces.

5. In rimless spectacles, a pair of lenses, a bridge including an arcuate top portion provided at each end with a horizontal part directed towards the top edge of a lens, a pair of oppositely disposed spaced channel shaped members mounted against each lens, one of the members of each pair being seated upon the inner end portion of the top edge and terminating at one end at the top of the nasal side edge of a lens, the other member of each pair being seated upon the outer end portion of the top and upper end portion of the temple side edges of a lens and terminating at one end at a point below and in proximity to the upper end of the temple side edge of the lens, a pair of ears extending inwardly from each of said members, said ears being anchored against the faces of a lens, each of said horizontal parts merging into one of the members of said pair of members and a pair of temple endpieces, each of said endpieces merging at its inner end into the other member of each pair of members, the high part of said arcuate top portion of the bridge being in substantial horizontal alignment with the high part of the top edges of said lenses.

6. In rimless spectacles, a pair of lenses, a bridge including an arcuate top portion provided at each end with a horizontal part directed towards the top edge of a lens, a pair of oppositely disposed spaced channel shaped members mounted against each lens, one of the members of each pair being seated upon the inner end portion of the top edge and terminating at one end at the top of the nasal side edge of a lens, the other member of each pair being seated upon the outer end portion of the top and upper end portion of the temple side edges of a lens and terminating at one end at a point below and in proximity to the upper end of the temple side edge of the lens, a pair of ears extending inwardly from each of said members, said ears being anchored against the faces of a lens, each of said horizontal parts merging into one of the members of said pair of members, a pair of temple endpieces, each of said endpieces merging at its inner end into the other member of each pair of members, said horizontal parts being located above the nasal side edges of said lenses, and said endpieces being located at the upper ends of the temple side edges of said lenses.

7. In rimless spectacles, a mounting for the lenses thereof, said mounting including a bridge, two pairs of parts, one pair for each lens, the parts of each pair being oppositely disposed, one part of each pair being at an end of the top of and for extension from the bridge towards the nasal side of a lens and the other part of each pair for extension from a temple bar towards the temple side of the lens, the parts of each pair being disposed in parallel planes disposed parallel to the horizontal median of that lens with which the parts of a pair are associated, one part of each of said pairs of parts extending in the same plane, and oppositely disposed like channel-shaped means integral intermediate the ends thereof with the inner ends of said parts for coupling the latter to the lenses, said means being of a contour and length for overlapping the faces of the lenses and for seating against and for extending in opposite directions from the points of mergence of the side edges with the top edges of the lenses, said means including holdfast devices positioned below and in proximity to the top edge of the lenses for anchoring said means to the lenses.

8. In rimless spectacles, a mounting for the lenses thereof, said mounting including a bridge, two pairs of parts, one pair for each lens, the parts of each pair being oppositely disposed, one part of each pair having its inner end at an end of the top of the bridge and positioned for extension from the bridge towards the upper end of the nasal side of a lens and the other part of each pair for extension from a temple bar towards the temple side of the lens, the parts of each pair being disposed in parallel planes disposed parallel to the horizontal median of that lens with which the parts of a pair are associated, one part of each of said pairs of parts extending in the same plane, means integral with said parts for coupling the latter to the lenses, said means being of a length and contour for seating against the upper ends of the side edges and the ends of the top edges of the lenses, said means including holdfast devices positioned below and in proximity to the top edge of the lenses for anchoring said means to the lenses, and the said two pairs of parts being disposed intermediate the ends of said means.

9. In rimless spectacles, a mounting for the lenses thereof, said mounting including a bridge, two pairs of horizontally disposed upper and lower parts, one pair for each lens, the parts of each pair being oppositely disposed, one part of each pair having one end at an end of the top of the bridge and permanently disposed at a point for extension from the bridge towards the upper end of the nasal side of a lens and the other part of each pair permanently disposed at a point for extension from a temple bar towards the upper end of the temple side of the lens, the parts of each pair being disposed in parallel planes disposed parallel to the horizontal median of that lens with which the parts of a pair are associated, the upper and lower parts of one pair of parts extending respectively in the same planes as the planes of the upper and lower parts of the other pair of parts, means of like form integral with said parts for coupling the latter to the lenses, the said means being formed for seating against and overlapping the edge portions of the sides and top edges of the lenses and including holdfast devices positioned below and in proximity to the top edge of the lenses for anchoring said means to the lenses, and said parts being disposed at the upper portion of said means.

10. In rimless spectacles, a pair of spaced lenses, an inverted yoke-shaped bridge interposed between and having the ends of its top portion formed with oppositely disposed horizontal parts extending laterally therefrom towards the top edges of the lenses, two pairs of channel-shaped members, the members of each pair being oppositely disposed and arranged in spaced relation, the members of each pair being seated upon and overlapping the upper edge portions at the temple and nasal sides of a lens, a pair of horizontally disposed parts for connection to temple bars and each extending from and integral with one of the members of each pair, each of the other horizontal parts being integral with the other member of a pair, means arranged in close proximity to the top edges of said lenses for anchoring said members to the lenses, and said temple bar connecting parts being located in a plane in close proximity to the top edges of the lenses.

11. In rimless spectacles, a strap comprising a curved channel-shaped part for seating against and overlapping a curved lens edge, a pair of parallel spaced curved apertured ears depending from the upper ends of the inner side edges of said part, said ears having their lower portions directed toward said lens edge and having their apertures arranged substantially in vertical alignment with the points of joinder of the ears and said part, and a horizontal part secured to the upper portion of the outer face of and directed outwardly from said channel-shaped part.

12. In rimless spectacles, a strap comprising a curved channel-shaped part for seating against and overlapping a curved lens edge, a pair of parallel spaced curved apertured ears depending from the upper ends of the inner side edges of said part, said ears having their lower portions directed toward said lens edge and having their apertures arranged substantially in vertical alignment with the points of joinder of the ears and said part, and a horizontal part secured to the upper portion of the outer face of and directed outwardly from said channel-shaped part, the top edges of said ears and the upper face of said horizontal part being flush with the top edge of said channel-shaped part.

13. In rimless spectacles, a mounting for the lenses thereof, said mounting including a bridge formed of a top and a pair of depending sides, nose guards carried by said sides, two pairs of horizontally disposed parts, the parts of each pair being oppositely disposed, a coupling means of like form for each of said parts of said pairs of parts, the coupling means for the parts of each pair of parts being oppositely disposed, each coupling means including a body portion of a contour and length for seating against the upper portion of a side edge and an end portion of the top edge of a lens, the body portion of each coupling means having its outer edge integral with one end of that part with which it is associated and extending above and below said part, one of said parts of each pair being extended from one end of the top of the bridge and extending outwardly from the latter, the other part of each pair being extended outwardly from its coupling means, each of said coupling means having parallel parts extended from the inner edge of its body portion, arranged below one end of each of said parts for overlapping and for the passage of a holdfast device to anchor said means to a lens, the said pairs of parts disposed in parallel planes above and parallel to the horizontal medians of the lenses, and the said pairs of parallel parts of the coupling means being of a length to have their inner ends located in close proximity to the ends of the top edges of the lenses.

EMANUEL PAPPERT.